United States Patent
Bodlaj

[11] 3,899,748
[45] Aug. 12, 1975

[54] METHOD FOR THE FREQUENCY STABILIZATION OF A LASER

[75] Inventor: Viktor Bodlaj, Munich, Germany

[73] Assignee: Siemens Aktiengesellschaft, Berlin & Munich, Germany

[22] Filed: Sept. 27, 1972

[21] Appl. No.: 292,613

[30] Foreign Application Priority Data
Sept. 27, 1971 Germany............................ 2148193

[52] U.S. Cl............................................ 331/94.5 S
[51] Int. Cl............................................. H01s 3/11
[58] Field of Search................................. 331/94.5

[56] References Cited
UNITED STATES PATENTS
3,361,990   1/1968   Gordon et al...................... 331/94.5
3,668,547   6/1972   Bodlaj............................... 331/94.5

Primary Examiner—William L. Sikes
Attorney, Agent, or Firm—Hill, Gross, Simpson, Van Santen, Steadman, Chiara & Simpson

[57] ABSTRACT

A method for the frequency stabilization of a laser, in particular for a He-Ne laser is described whereby the active medium is situated between a fixed mirror and a movable mirror which can be translated along the axis of the laser by a piezo ceramic, and the laser radiation is circularly polarized by means of a small $\lambda/4$ polarizing plate and passes through an absorption tube located within a magnetic coil which is part of a resonator loop and filled with the laser-active gas, and a photo-sensitive element behind the absorption tube and outside the resonator produces a signal, via amplifiers and demodulating devices for controlling the piezo ceramic. The control signal is proportional to the frequency deviation of the laser radiation from the center frequency $\gamma_0$. The method is particularly characterized by the intensity modulation of the laser radiation which is produced due to the alternating effect of the alternating magnetic field in the absorption tube and which depends on the center frequency $\gamma_0$ at the inverse Lamb-dip being utilized for the production of the control signal.

3 Claims, 3 Drawing Figures

METHOD FOR THE FREQUENCY STABILIZATION OF A LASER

BACKGROUND OF THE INVENTION

1. Field of the Invention

This invention relates to a method for the frequency stabilization of a laser, in particular a helium-neon (He-Ne) laser, wherein the stimulated medium is located between a fixed mirror and another mirror which can be moved in the axial direction of the laser by a piezo ceramic, and wherein the laser radiation is circularly polarized by means of a small $\lambda/4$ polarizing plate and passes through an absorption tube within a magnetic coil forming part of a resonator loop and filled with the laseractive gas. A photo-sensitive element behind the absorption tube and outside the resonator, together with amplifier and demodulating devices, produces a signal which serves for controlling the piezo ceramic, the control signal being proportional to the frequency deviation of the laser radiation from the center frequency $\gamma_0$.

2. Description of the Prior Art

The dichroism of the gas in the absorption tube which occurs in two separate curves due to the Zeeman splitting of the absorption curve, due to the magnetic field must be utilized, whereby one of the curves effects an alternating effect with a left-circularly polarized laser wave and the other curve a right-circularly polarized laser wave. As soon as the operational frequency $\gamma$ of the laser does not coincide with the center frequency $\gamma_0$ of the maximum of the non-split absorption curve, weakening of the laser beam will result during its passage through the absorption tube, while fluctuating at the frequency of the magnetic field in the absorption tube with an amplitude proportional to the amount of deviation up to a certain deviation of the laser frequency from the center frequency $\gamma_0$. The amplitude of the alternating current caused by such a modulated laser beam in a photo-diode can serve as a control signal for adjusting the laser mirror which is movable by a piezo ceramic element in order to tune the laser to the center frequency $\gamma_0$.

A similar method is disclosed in the publication *Applied Physics Letters*, Vol. 10, No. 11, 1967, pages 303–304. In this prior art method, however, the control signal is not obtained through the utilization of the alternating magnetic field in the absorption tube. The frequency stabilization which can be obtained by the arrangement described in this publication, however, suffers in particular due to the poor signal/noise ratio.

It has previously been suggested in the German patent applications P 16 39 401.7-33 and P 20 15 612.1 either to embody the magnetic coil of an absorption cell with an arrangement for frequency stabilizing a laser of the initially mentioned kind in such a way that it forms the inductance of an electric oscillator circuit driven by a resonant frequency amplifier outside of a laser resonator, or that it operates the laser discharge itself within the magnetic field, instead of utilizing the absorption cell.

In the latter case it would be possible to obtain an equally good frequency stabilization as is obtained with the arrangement described in the literature, while at the same time having essentially lower costs, although a more accurate frequency stabilization is obtained in the first case due to an essentially improved signal/noise ratio.

SUMMARY OF THE INVENTION

The present invention is based on the object of providing a method for the frequency stabilization of a laser of the above kind, whereby a higher relative and absolute frequency stabilization can be obtained than with arrangements heretofore suggested.

Proceeding from the recognition that the axial magnetic field of an absorption tube splits the absorption characteristic into two oppositely circularly polarized absorption curves, and that the oppositely circularly polarized laser waves initiate an alternating effect with the absorption profile of the center frequency, which also shifts the Lamb-dip, the above object of the present invention is achieved by providing that the intensity modulation of the laser radiation which is produced due to the alternating effect of the alternating magnetic field in the absorption tube, and which depends on the center frequency $\gamma_0$ of the inverse Lamb-dip, is utilized for producing a control signal which is suited for the frequency stabilization.

Since a laser-frequency-dependent intensity modulation occurs for the laser radiation with an alternating magnetic field in the absorption tube, the control signal will preferably be obtained from the intensity modulation by means of evaluating basic wave.

The fact that the laser mirror no longer has to be wobbled for scanning the inverse Lamb-dip, which leaves the laser beam free from frequency modulation, is a particular advantage of the arrangement constructed in accordance with the present invention. It results in essentially improved coherence length and the adjustment accuracy is essentially increased due to the more sensitive scanning of the frequency standard.

BRIEF DESCRIPTION OF THE DRAWING

Other objects, features and advantages of the invention, its design, construction and operation will be best understood from the following detailed description of a preferred embodiment thereof taken in conjunction with the accompanying drawing, on which.

DESCRIPTION OF THE PREFERRED EMBODIMENT

Figure 1:
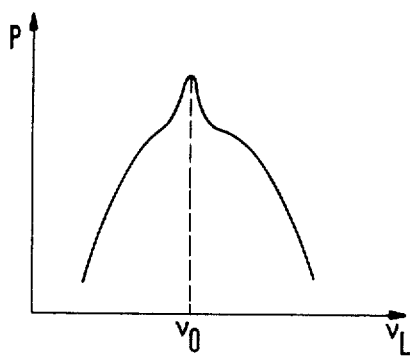
FIG. 1 is a graphic illustration of the output power P of a laser as a function of the frequency $\gamma_L$ of a helium-neon laser with a neon absorption tube in the resonator.

The absorption curve of a Ne absorption tube is very narrow with small pressures of 0.05 through 0.1 torr whereby the collision broadening is very small. The absorption of such a tube is very low. If such a tube of about 24 cm length is placed in a laser resonator so that the laser output power depends on internal losses, this low absorption can have essential influence on the output power of the laser. With a higher intensity of the laser radiation, the absorption can rapidly reach saturation resulting in a step-like increase of the laser output power. This phenomenon is called the inverse Lamb-dip, and as is evident in FIG. 1, the center frequency $\gamma_0$ is located at the power maximum defined by the inverse Lamb-dip.

Since the axial magnetic field in the Ne absorption tube splits the absorption into two oppositely circularly polarized absorption characteristics, an alternating effect with a low frequency right-circularly polarized absorption profile of the center frequency will occur, for example, for the right-circularly polarized (RCP) laser wave of the frequency $\gamma_L$ which moves opposite to the magnetic field direction in the absorption tube, according to the relationship $$\gamma_1 = \gamma_0 - \Delta\gamma/2$$

Figure 2:
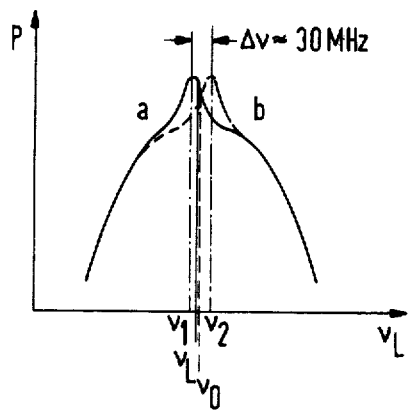
FIG. 2 is a graphic illustration of the laser output power P as a function of the frequency $\gamma_L$ of a helium-neon laser with a neon absorption tube which is positioned in an axial magnetic field H (curve *a*) and -H (curve *b*)

When the magnetic field direction is reversed, the RCP absorption is $$\gamma_2 = \gamma_0 + \Delta\gamma/2$$

so that the RCP laser wave starts an alternating effect with the higher frequency absorption profile, as illustrated in FIG. 2.

Due to the shifting of the corresponding absorption profile in the absorption tube, the inverse Lamb-dip is also shifted. FIG. 2 illustrates the laser power for small magnetic field strengths of approximately $8^{-}10^{4}$ T, depending on the laser frequency $\gamma_L$ and the magnetic fields H and -H.

With axial alternating magnetic field in the absorption tube, an intensity modulation will occur for the laser radiation with an amplitude depending on the laser frequency $\gamma_L$. The time dependence of the intensity modulation for the frequency $\gamma_L < \gamma_0$ and the frequency $\gamma_L > \gamma_0$ will only differ with respect to phase by an amount $\pi$, whereby $\gamma_0$ with zero magnetic field represents the center frequency of the inverse Lamb-dip. The intensity modulation produced with the alternating magnetic field indicates the position of the laser frequency due to its phase and amplitude, with respect to the center frequency $\gamma_0$ of the inverse Lamb-drip. Therefore, this intensity modulation can be utilized as a control criterion for the frequency stabilization of the laser.

Figure 3:
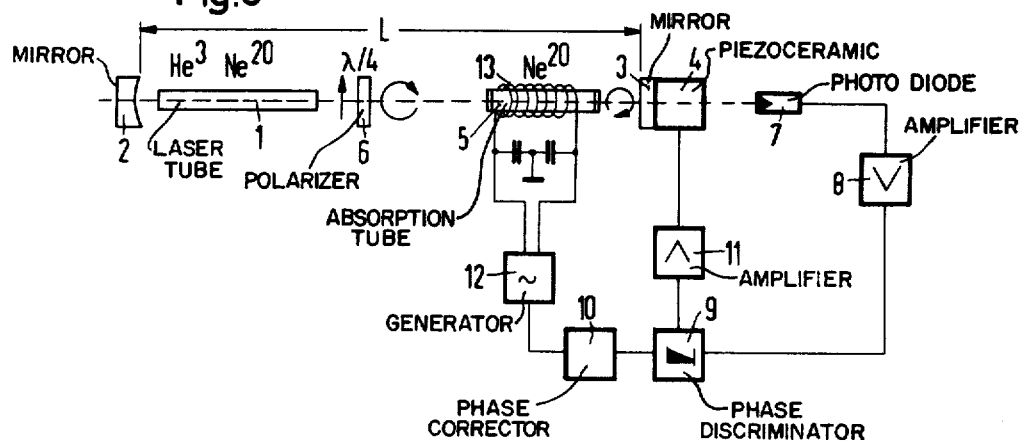
FIG. 3 is a schematic diagram of a circuit constructed to carry out frequency stabilization of a laser according to the principles of the present invention.

Referring to FIG. 3, a laser arrangement comprises a helium-neon laser tube 1 situated between a pair of resonator mirrors 2 and 3. The resonator mirror 2 is fixed, while the mirror 3 is attached to a piezo ceramic 4 and is accordingly movable in the axial direction of the laser in accordance with an electrical energization of the piezo ceramic. An absorption tube 5 is located in the resonator between a $\lambda/4$ polarizing plate 6 and the movable mirror 3. A photo-diode 7 outside the resonator receives radiation through the mirror 3 to produce a signal which is amplified by an amplifier 8. The output of the amplifier 8 and the output of a generator 12 are fed to a phase discriminator 9, where the output of generator 12 passes through a phase correcting circuit 10 for amplitude and phase comparison. The discriminator 9 produces a direct voltage which is a function of the laser frequency deviation $\gamma_0 - \gamma_L$. The voltage differs in polarity for a laser frequency $\gamma_L < \gamma_0$ and a laser frequency $\gamma_L < \gamma_0$. The generator 12 provides the current for the alternating magnetic field on the absorption tube 5 by means of a coil 13.

In operation, the voltage for correcting the distance L between the mirrors 2 and 3 is obtained with the help of the piezo ceramic 4 when the laser frequency deviates from the frequency $\gamma_0$, in the following manner:

For example, a right-circularly polarized laser wave of the laser tube 1 is obtained with a $\lambda/4$ polarizing plate 6 and undergoes the above-described intensity modulation of the laser radiation in the absorption tube 5 with the help of the alternating magnetic field produced by the coil 13. After the demodulation of the intensity modulation of the wave by means of a photo-diode 7, the fundamental of the output signal is amplified in a selective amplifier 8 and supplied to a phase discriminator 9. The fundamental in the phase discriminator 9 is compared in amplitude and phase with the signal produced by the generator 12 which is used for producing alternating magnetic field in the coil 13. The direct voltage which is produced by the discriminator 9, as mentioned above, depends on the laser frequency deviation from the center frequency $\gamma_0$. The direct voltage has a polarity depending on whether the laser frequency $\gamma_L$ is greater than or less than the center frequency $\gamma_0$. The laser-frequency dependent direct voltage is supplied to the piezo ceramic 4 in the laser resonator in order to correct the resonator length or the laser frequency, respectively, via a direct voltage amplifier 11 in order to stabilize the laser frequency.

The arrangement suggested herein is advantageous due to the fact that it produces a high relative and absolute frequency stability, good reproducibility, high coherence length, simple construction, and low interference sensitivity, as well as simple operation. Therefore, the design is particularly well suited for application in length measuring techniques, as a standard and for technical data problems.

Although I have described my invention by reference to a particular exemplary embodiment thereof, many changes and modifications of my invention may become apparent to those skilled in the art without departing from the spirit and scope of my invention. I therefore intend to include within the patent warranted hereon all such changes and modifications as may reasonably and properly be included within the scope of my contribution to the art.

I claim:

1. A method for the frequency stabilization of a laser of the type wherein an active laser medium is situated in a resonator between a fixed mirror and a movable mirror, said movable mirror attached to a piezo ceramic and movable in the axial direction of the laser upon energization of the piezo ceramic, and wherein the laser radiation is circularly polarized and passes through an absorption tube within a magnetic coil in the resonator and filled with the laser active gas, and a photosensitive element behind the absorption tube and outside the resonator receives the laser beam and produces a signal which is proportional to the frequency deviation of the laser radiation from the center frequency $\gamma_0$ caused by the absorption tube, and wherein the laser radiation is intensity modulated by an alternating energization of the coil and comprising the steps of:

comparing the amplitude and phase of the signal produced by the photosensitive element with the alternating wave which energizes the coil, the alternating wave depending on the center frequency $\gamma_0$ caused by the absorption tube, of the inverse Lamb-dip in the laser power-frequency characteristic, to produce a control signal; and applying the control signal to the piezo ceramic to produce a change of length of the resonator.

2. A method according to claim 1, comprising the step of selecting the fundamental frequency from the laser radiation for comparison with the frequency used for energizing the coil.

3. In a laser arrangement of the type wherein a stimulatable gas laser medium is arranged between a fixed mirror and a movable mirror carried by a piezo ceramic element to define a resonator, and laser radiation is circularly polarized by a small $\lambda/4$ plate disposed between the laser medium and the movable mirror, and an absorption tube is disposed within a coil located between the $\lambda/4$ plate and the movable mirror and a generator is provided to energize the coil at a frequency dependent upon the center frequency of an inverse Lamb-dip caused by the absorption tube of the laser power-frequency characteristic to intensity modulate the laser radiation, the improvement in combination therewith of means for stabilizing the frequency of the laser, comprising:

a photosensitive device disposed outside of said resonator and receiving the laser radiation to produce signals in response to the laser radiation;

a selective amplifier for amplifying the basic laser wave connected to said photosensitive device;

a phase correcting circuit connected to the generator which supplies the wave for intensity modulation;

a discriminator connected to said phase correcting device and to said selective amplifier for comparing the amplitude and phase of the signals supplied thereto and for producing a direct current voltage having a polarity dependent upon the direction of deviation of the laser radiation from the center frequency of the inverse Lamb-dip; and means connecting said discriminator to said piezo ceramic for energizing said piezo ceramic in accordance with said control signal to change the length of the resonator and adjust the frequency of laser radiation.

* * * * *